United States Patent [19]
Belding et al.

[11] Patent Number: 5,542,968
[45] Date of Patent: Aug. 6, 1996

[54] ENTHALPHY WHEEL

[75] Inventors: William A. Belding, Danville, Calif.;
Scott Janke, Baton Rouge, La.;
William D. Holeman, Baton Rouge,
La.; Marc P. F. Delmas, Baton Rouge,
La.

[73] Assignee: LaRoche Industries, Inc., Baton Rouge, La.

[21] Appl. No.: 377,462

[22] Filed: Jan. 24, 1995

[51] Int. Cl.$^6$ .................................................. B01D 53/04
[52] U.S. Cl. ................................ 96/125; 96/150; 96/153
[58] Field of Search ................................ 55/524; 95/113, 95/117, 121; 96/108, 123, 125, 151, 153

[56] References Cited

U.S. PATENT DOCUMENTS

| | | | |
|---|---|---|---|
| 3,024,867 | 3/1962 | Milton | 95/124 |
| 3,266,973 | 8/1966 | Crowley | 162/164 |
| 3,338,034 | 8/1967 | Hemstreet | 55/269 X |
| 3,807,149 | 4/1974 | Norback | 96/125 X |
| 3,844,737 | 10/1974 | Macriss et al. | 96/125 X |
| 4,012,206 | 3/1977 | Macriss et al. | 95/113 |
| 4,093,435 | 6/1978 | Marron et al. | 55/269 X |
| 4,134,743 | 1/1979 | Macriss et al. | 95/113 |
| 4,255,171 | 3/1981 | Dravnieks | 55/269 X |
| 4,259,092 | 3/1981 | Matsuo et al. | 96/125 X |
| 4,370,249 | 1/1983 | Bird et al. | 252/607 X |
| 4,504,290 | 3/1985 | Pontius | 96/153 |
| 4,729,853 | 3/1988 | von Bonin | 252/607 X |
| 4,769,053 | 9/1988 | Fischer, Jr. | 96/125 |
| 4,946,479 | 8/1990 | Izumo | 96/123 |
| 5,126,076 | 6/1992 | Graf et al. | 252/607 X |
| 5,130,184 | 7/1992 | Ellis | 252/607 X |
| 5,194,414 | 3/1993 | Kuma | 96/153 X |
| 5,225,236 | 7/1993 | Keusch et al. | 428/920 X |
| 5,230,955 | 7/1993 | Diroll et al. | 428/920 X |
| 5,250,350 | 10/1993 | Tung | 428/920 X |
| 5,300,138 | 4/1994 | Fischer et al. | 96/125 |
| 5,304,419 | 4/1994 | Shores | 428/355 |
| 5,308,703 | 5/1994 | Tsujimoto et al. | 96/153 X |

FOREIGN PATENT DOCUMENTS

| | | | |
|---|---|---|---|
| 51-029388 | 3/1976 | Japan | 96/153 |
| 56-030595 | 3/1981 | Japan | 96/153 |
| 5-200224 | 8/1993 | Japan | 96/153 |

*Primary Examiner*—Robert Spitzer
*Attorney, Agent, or Firm*—Andrew Alexander

[57] ABSTRACT

Disclosed is a gas permeable, sensible and latent heat exchange media having a multiplicity of passageways therethrough through which an air stream can flow, the sensible and latent heat exchange media. The heat exchange media comprises a fibrous support material, a finely powdered desiccant material and fire retardant contained in the fibrous support material. The fibrous support material and the fire retardant are capable of adsorbing sensible heat from a warm air stream and releasing the absorbed sensible heat into a cool air stream as the air stream flows through the sensible and latent heat exchange media. The desiccant material is capable of adsorbing moisture from a humid air stream flowing through the sensible and latent heat exchange media and capable of releasing the adsorbed moisture into a dry air stream flowing through the passageways of the sensible and latent heat exchange media.

42 Claims, 1 Drawing Sheet

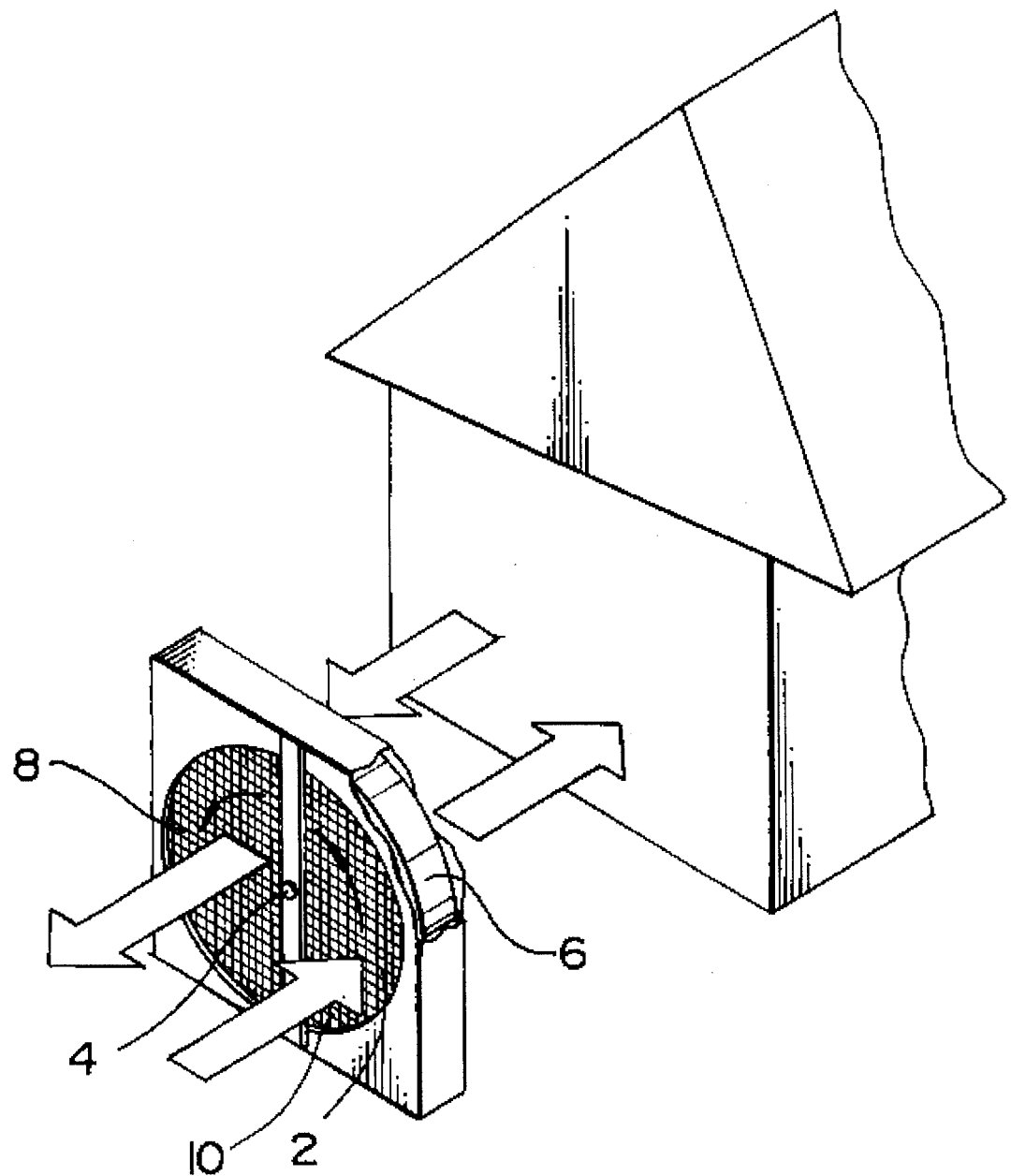

ENTHALPHY WHEEL

BACKGROUND OF THE INVENTION

This invention relates to an enthalpy wheel by which heat and moisture are exchanged between a supply air stream and an exhaust air stream, and more particularly, the invention relates to a new desiccant paper suitable for fabricating into an enthalpy wheel which will aid in regulating the temperature and humidity of ambient air.

Enthalpy wheels or heat exchange wheels are mounted across a supply air stream and an adjacent exhaust air stream. The wheels rotate and continuously remove heat and/or moisture from one stream and return heat and/or moisture to the adjacent stream. The wheels are usually fabricated to provide a multiplicity of parallel pores or openings such as a honeycomb structure through which the air passes. Often, the wheels are formed from paperboard having one side corrugated and one side flat. The wheels are formed by winding the paperboard into the wheel shape to provide air passageways parallel to the axis of the wheel. The paperboard is comprised of a matrix or media capable of absorbing moisture an&or thermal energy from one stream and upon further rotation of the wheel, releasing the moisture and/or thermal energy to the adjacent stream which is to be conditioned. For example, the wheel can be used to recover moisture and heat from exhaust air at relatively high temperature for transfer to incoming air which is relatively dry and cool. Also, the wheel can be used to dehumidify and cool a moist, hot incoming stream by extracting moisture and heat from such stream and transferring the same to an exhaust stream from an air conditioned building that is relatively cooler and drier.

To improve indoor air quality, there is a great need to increase levels of outdoor air ventilated into buildings. However, it is important to minimize the cost associated with the introduction of outside air. For example, in winter, introducing cold, dry outdoor air to a building increases the heating load and adds to the fuel requirement. In summer, introduction of warm, humid outdoor air adds greatly to the air conditioning costs. Thus, to minimize costs associated with introduction of fresh air, heat exchangers such as rotating wheels have been employed to recover or reject, as needed, a portion of the sensible heat from the indoor air stream through exchange with the outdoor air stream. Further, some of the heat exchangers provide for latent heat exchange by incorporating a desiccant into the heat exchange surface. Thus, in summer moisture in an outdoor air stream being introduced to a building is removed and transferred to drier indoor air stream exiting the building. Conversely, in winter, moisture from air being ventilated from the building is adsorbed by the desiccant and subsequently desorbed into the drier outside air being introduced to the building. Thus, such heat exchangers transfer both sensible and latent heat and are often referred to as a total energy exchanger or an enthalpy exchanger. However, while these devices are very desirable for proposes of conserving energy and reducing heating and cooling bills, they have not found widespread acceptance because of their relatively high cost of production. The use or acceptance of less expensive devices fabricated from inexpensive materials such as plastics or paper and the like has always been greatly hampered by the fear of fire and smoke because the heat exchange device is mounted in the air duct to the building.

Thus, there is a great need for a safe, inexpensive heat exchange device that can be fabricated from inexpensive materials without fear of fire or smoke problems and yet provides a high level of sensible as well as latent heat exchange.

Prior references recognize the need for safe heat exchange devices. U.S. Pat. No. 4,093,435 discloses a rotary regenerative total heat energy exchanger having an asbestos-free heat exchange media formed by spirally winding flat and corrugated webs of aluminum foil and/or fully bleached, 45 lb Kraft paper constituted by 84% fibers and 16% salts. The patent notes that single-faced corrugated paperboard is made using a conventional silicate-type glue between a flat ply and a corrugated ply and that each ply is a Kraft paper treated with a mixture of ammonium sulfide and diammonium phosphate. Further, the patent notes that these constituents are hydroscopic, improve latent heat transfer capabilities and impart a fire-retardant characteristic to the material. However, such constituents can result in biological growth because the paper is primarily wood pulp based. Further, the wood pulp based papers tend not to age well in continuous long term use.

U.S. Pat. No. 4,134,743 discloses the use of zeolites as a desiccant in a regeneratable heat exchange apparatus. The apparatus comprises a rotatable wheel fabricated from a paper support material comprising cellulose fibers, glass fibers, asbestos, synthetic plastic fibers and zeolite desiccant in the amount of 1 to 90 wt. %. However, these materials are relatively expensive.

Adsorbents and fibrous materials useful in a desiccant wheel are disclosed in U.S. Pat. Nos. 3,024,867; 4,012,206; 4,769,053; 3,266,973; 3,338,034 and 4,255,171.

In prior references, U.S. Pat. No. 4,729,853 describes flame-retarding sealing compounds used for sealing fractures in walls for fire prevention, optionally reinforced with metal grids, mineral or glass fibers, wood or cellulose fibers, carbon fibers and ceramide fibers.

U.S. Pat. No. 5,130,184 discloses a fire barrier coating which is applied as an air-setting paint, is used to form a coherent fire-barrier on or between susceptible wood or plastic substrates, or other substances. Consisting of a paint-like slurry of three separate but compatible and mutually synergistic co-bonding systems, viz. magnesium "oxychloride" cement, plus high alumina mono-calcium aluminate cement, plus colloidal silica dispersed in dimethyl formamide (DMF), and utilizing an aqueous solution of magnesium chloride as the common hydrating fluid for the two cements, the coating retains its structural integrity through prolonged exposure to flame temperatures of 2000° F.

U.S. Pat. No. 5,230,955 discloses thermoplastically reformable plastic sheets with flameproofing means, characterized by a core layer 1–10 mm thick comprised of polyether sulfone or a similar thermoplastic, which core material has a content of at least 0.5 wt. %, preferably at least 2 wt. %, of a flame-protective additive, such as boron trioxide; and said sheet or plate further characterized by outer layers firmly adhering to and covering the two faces of the core layer, at least 0.05 mm thick and comprised of a thermoplastic having a lower proportional content of the flame-protective additives than the core layer; are particularly useful for interior structures in passenger conveyances, such as airplanes.

U.S. Pat. No. 4,370,249 discloses a fire-resistant, cellulose insulation and method, the cellulose insulation including a predetermined quantity of talc to impart the desired degree of fire-resistant characteristics to the cellulose. Predetermined quantities of boron compounds can be added with the talc to improve the fire-suppressant characteristics of the insulation. The method includes directing ground cellulose from the primary grinding stage into a surge bin to accommodate metering the talc with the cellulose to thereby assure the appropriate distribution ratio of talc in the cellulose.

U.S. Pat. No. 5,126,076 discloses low-flammability structural elements, particularly boards, and to a process for constructing them. The low-flammability structural elements are constructed utilizing combustible plastics waste material. They contain in addition non-combustible inorganic additives and a flame-proofing agent mixture. The components are held together by at least one hardened adhesive. Because of this build-up, the structural elements display, despite the combustible components, low-flammability.

U.S. Pat. No. 5,250,350 discloses a coextruded film with both gas barrier and fire retardant properties as well as good physical properties made up by melt coextrusion to form a four or five layer film product useful in making laminates for protective clothing or tarps. The five layer film has a Saran resin barrier core layer and LDPE skin layers on each face with intervening EVA glue layers. The four layer film has a Saran resin barrier core layer and a CPE skin layer on one face and an EVA skin layer on the other with an EVA glue layer between the barrier core layer and the CPE skin layer. Each skin layer and each glue layer contains about 8 to about 30 wt. % of a polyhalogenated organic/antimony oxide fire retardant and a small amount of a slip agent.

U.S. Pat. No. 5,225,236 discloses a protective drape and methods for using the drape to protect or shield an object against the harmful effects of accidental exposure to optical radiation, electrical discharge, heat or an open flame. The present invention comprises a flexible solid sheet and a composite scrim and includes methods for predicting/determining the suitability of a chosen metallic component for use in the instant drape.

U.S. Pat. No. 5,300,138 discloses a desiccant composition having a moderate Langmuir Type 1 moisture adsorption isotherm with a separation factor of frown 0.05 to 0.13. The composition contains silica gel, a modified 13× molecular sieve (modified by replacing at least 20% of the sodium cations with other metallic cations, e.g., potassium cations), and desirably a hydrophobic adsorbent (desirably a hydrophobic molecular sieve). The composition may be used as the desiccant in a rotary regeneratable dehumidification wheel, thereby significantly enhancing dehumidification performance and simultaneously removing a significant proportion of the airborne pollutants typically contained in indoor and outdoor air.

U.S. Pat. No. 5,304,419 discloses an enclosure for providing both a moisture free and particle free environment. A portion of the inner surface of the enclosure, that comprises an electronic device sealed in a container, is coated with a pressure sensitive adhesive comprising 4–40 vol. % of a solid desiccant. The preferred adhesive is a silicone pressure sensitive adhesive and the preferred desiccant is zeolite.

Yet, in spite of these disclosures, there is still a great need for a safe, inexpensive total heat exchange device free of smoke or fire problems and yet providing a high level of sensible heat exchange.

SUMMARY OF THE INVENTION

It is an object of the invention to provide an improved enthalpy exchanger.

It is another object of this invention to provide an improved, inexpensive enthalpy wheel highly resistant to fire hazards.

It is a further object of this invention to provide an enthalpy wheel having improved fire resistant properties and sensible heat characteristics.

Yet, it is another object of this invention to provide an improved total energy wheel that can be operated at a relatively slow revolution for improved adsorption and desorption.

These and other objects will become apparent from a reading of the specification and claims appended hereto.

In accordance with these objects, there is provided a gas permeable, sensible and latent heat exchange media having a multiplicity of passageways therethrough through which an air stream can flow. The heat exchange media comprises a fibrous support material, a finely powdered desiccant material and a fire retardant contained in the fibrous support material. The fibrous support material and the fire retardant are capable of adsorbing sensible heat from a warm air stream and releasing the absorbed sensible heat into a cool air stream as the air stream flows through the sensible and latent heat exchange media. The desiccant material is capable of adsorbing moisture from a humid air stream flowing through the sensible and latent heat exchange media and is capable of releasing the adsorbed moisture into a dry air stream flowing through the passageways of the sensible and latent heat exchange media.

BRIEF DESCRIPTION OF THE DRAWING

The sole FIGURE shows a schematic of a heat exchange wheel in a cassette in accordance with the invention.

DETAILED DESCRIPTION OF THE PREFERRED EMBODIMENTS

Referring now to the FIGURE, there is shown a schematic of an enthalpy wheel 2 in accordance with the invention. The wheel, which is shown in a cassette, has a central hub and shaft 4 for supporting the wheel within the cassette and a cylindrical outer casing 6. Further, the wheel may have radial spokes (not shown) extending from hub 4 to outer casting 6. Schematically, wheel 2 is shown divided into two parts, 8 and 10. An exhaust air stream is shown exiting through part 8 and air or inlet stream is shown flowing through part 10 countercurrent to the exhaust stream. Wheel 2 transfers both latent and sensible heat energy from the exhaust stream from a room or building or the like to the intake stream to the room from a fresh air supply stream. Depending on the season, in winter, for example, moisture in the exhaust stream is absorbed by the wheel and desorbed into make-up air. In summer, moisture in the make-up air is absorbed by the wheel and removed from the wheel by the drier exhaust stream. These functions are performed on a continuous basis as the wheel rotates and is regenerated by the countercurrent flow. The wheel typically rotates at a speed of about 1 to 30 rpm.

Between central hub 4 and outer casing 6 is a total heat energy and moisture exchange media. In one embodiment, the media is fabricated by providing alternating layers of flat and corrugated paperboard that are positioned to provide a multiplicity of open-ended passages parallel to the axis of rotation to permit air to flow therethrough. Typically, the media is formed by winding a web of corrugated paperboard (having a flat sheet of paperboard bonded to one side) around hub 4 until a multi-layered media is built up that extends to outer casing 6. The corrugated paperboard having one side flat is made by bonding or positioning a flat strip of paperboard over a corrugated strip of paperboard. The width of the strip determines the width of the wheel and the edges of the paperboard forms the faces of the wheel. It should be understood other fabrication techniques that form passages may be used.

The improved paperboard in accordance with the invention is comprised of desiccant, fibrous material, flame retardant and optional binders.

Desiccant

The desiccant can be any material capable of efficiently adsorbing moisture from an air stream and capable of efficiently desorbing said moisture to a counter flowing air stream. Thus, the desiccant can comprise the use of finely powdered solid, crystalline alkali metal or alkaline earth metal compounds capable of absorbing and desorbing moisture from or to an air stream. Examples of such adsorbants are active carbons, silica gels, activated aluminas and molecular sieves or zeolites and the like and mixtures of these compounds. Other compounds that may be used are halogenated compounds such as halogen salts including chloride, bromide and fluoride salts, for example. The preferred desiccant is formed from zeolites. The zeolites can be natural crystalline zeolites such as stilbite or synthetic crystalline alumino-silicates referred to as molecular sieves. These materials are activated for adsorption by removing their water of hydration. Further, crystalline zeolites are preferred over alumina and silica gel because they exhibit less hysteresis during desorption which provides a more efficient moisture exchange between exit and intake air streams. In addition, zeolites are preferred over activated aluminas and silica gels because activated aluminas and silica gels have a wide pore size distribution, 8 Å to 70 Å for activated aluminas and 8 Å to 100 Å for silica gels. The large pores in the structure can retain airborne contaminants, some of which may impart odor, and these compounds can be desorbed into the make-up air stream returning the contaminants and odors to the building. Thus, purification of air in the building has been compromised. For purposes of the invention, synthetic zeolites are preferred over natural zeolites because the natural-occurring zeolites can have a broader pore size distribution.

Synthetic zeolites include zeolites A, D, L, R, S, T, X and Y. Zeolite A is a crystalline zeolite having the general formula:

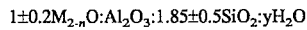

wherein M is metal, n is the valence of M and y may be any value up to 6. The zeolitic molecular sieves generally known in the art as 4 Å molecular sieves have a pore diameter of about 4 Å and have an alumino silicate crystalline structure A with sodium cations. 3 Å sieves have an alumino silicate structure A with sodium and potassium cations. In 3 Å molecular sieves, most of the sodium cations in a 4 Å molecular sieve are substituted with larger potassium cations which results in most of the pores in a 3 Å molecular sieve being 3 Å in diameter. In 5 Å molecular sieves, most of the sodium cations in a 4 Å molecular sieve are substituted with smaller calcium cation and most of the pores in the 5 Å molecular sieve have about a 5 Å diameter.

Zeolite X, for example, has an ideal composition given by:

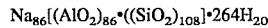

Cations may be exchanged so that the above formula is not absolute. Zeolites X and Y have topologically similar aluminosilicate framework structures, although they are distinct zeolite species with characteristic differences. The chemical compositions of zeolites X and Y are related to the synthesis method. The zeolites are distinguished on the basis of chemical composition, structure and their related physical and chemical properties. Differences are found in the cation composition and distribution, the Si/Al ratio and possible Si—Al ordering in tetrahedral sites. Typically, the Si/Al ratio for a zeolite X is between 1 and 1.5 whereas it is greater than 1.5 for a Y zeolite. Zeolites HY and USY may be obtained from NaY zeolites by different schemes: thermal decomposition of $NH_4^+$, hydrogen ion exchange, hydrolysis of a zeolite containing multivalent cations during dehydration.

For purposes of the present invention, suitable molecular sieves include 3A, 4A, 5A, 13X, NaY, HY and USY with 3A and 4A molecular sieves being preferred.

Desiccant suitable for use in the present invention can have a particle size ranging from 0.1 to 50 μm with a preferred particle size being 1 to 4 μm.

Fibrous Material

In the present invention, any type of fibrous material can be used that can be formed into fibers and thereafter formed by standard paper-making processes into paperboard having desiccant and fire retardant material contained therein. Examples of such fibers include wood pulp, e.g., cellulosic fibers, and synthetic fibers and mixtures thereof. Inorganic fibers, such as glass fibers and rock wool, etc., can be used but on a less preferred basis. Examples of synthetic organic fibers include nylon, polyethylene, polypropylene, acrylic, acetate, polyaramid and the like. Particularly suitable fibers are inexpensive organic fibers such as acrylic and cellulose fibers. Fibrous material utilized in the present invention can have a length in the range of 1 to 30 mm and 3 denier with a preferred length in the range of 3 to 15 mm and 2 to 4 denier.

Fire Retardant

The fire retardant that may be used in the present invention can be any fire retardant that can be combined with the adsorbent material and the fibrous material to form a paperboard suitable for use in an enthalpy wheel. Representative fire retardants can be selected from alumina trihydrates, magnesium hydroxide, boron compounds such as boric acid, sodium borate and zinc borate, compounds of antimony or molybdenum such as antimony trioxide, antimony pentoxide, antimony oxy- and halides, sodium antimonate, molybdic oxide and ammonium molybdate or combinations of these materials. The preferred fire retardant material is alumina trihydrate. Alumina trihydrate is preferred because it provides both flame retardant properties and thermal mass which greatly aids sensible heat exchange for the enthalpy wheel. Thus, instead of providing a solid metal strip for adsorbing sensible heat from a warm air stream, the present invention provides a fire retardant material admixed with the desiccant.

The alumina trihydrate referred to has the formula $Al_2O_3 \cdot 3H_2O$ which has a water of hydration of 34.6%, by weight. Thus, alumina trihydrate upon decomposition releases 34.6% by weight as water which is water of hydration. The water of hydration is stable between 220° and 230° C. Upon heating alumina trihydrate to temperatures higher than about 250° C., the hydrate begins to decompose endothermically. The products of decomposition are anhydrous alumina and water, and the formula is as follows:

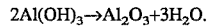

Thus, it will be seen that alumina trihydrate is particularly effective as a fire retardant at lower operating temperatures. If higher temperatures of operation are expected, then molybdenum hydroxide is suitable as a fire retardant. Because of its highly endothermic decomposition, the use of alumina trihydrate when used in sufficient amounts can maintain an organic material such as plastic used for the fibrous material below its ignition temperature, effectively inhibiting flame spread and smoke release.

The particle size of fire retardant utilized in the present invention can range from 0.1 to 80 µm with a preferred particle size being 1 to 20 µm.

Paperboard used in enthalpy wheels in accordance with the invention can comprise 5 to 60 wt. % desiccant, 5 to 35 wt. % fire retardant, the remainder comprising fibrous material. The desiccant and fire retardant together can be present in the range of 5 to 90 wt. %,. the remainder comprising fibrous material. Binder can be added as needed. For example, if cellulose fibers from wood pulp are used in sufficient quantity, binder does not have to be added. Preferred ranges comprise 10 to 55 wt. % desiccant, 10 to 30 wt. % fire retardant, the remainder comprising fibrous material. Typical composition ranges can comprise 15 to 35 wt. % desiccant, 10 to 25 wt. % fire retardant, the remainder fibrous material. A typical composition comprises about 50 wt. % fibrous material, about 20 wt. % desiccant, about 20 wt. % fire retardant and up to 10 wt. % binder. In certain instances, the flame retardant may be extended to 40 wt. % of the composition. Further, in some instances, it may be desirable to extend the desiccant to 75 wt. %.

For purposes of making paperboard in accordance with the invention, the fibrous material is first dispersed in an aqueous slurry.

Desiccant can be added to the dispersion containing the fibrous material or it may be dispersed separately in an aqueous solution to form an aqueous slurry. The amount of water used with desiccant is an amount sufficient to provide a low viscosity slurry. However, care should be used to avoid excess water which can result in slow production times. The desiccant slurry is stirred under low shear for purposes of mixing without excessive particle breakdown.

Fire retardant can be added to the desiccant slurry with the appropriate amount of water to maintain a low viscosity slurry and dispersed therein under low shear for purposes of mixing therewith. The fire retardant can be mixed with the desiccant in the proper proportion and then dispersed to provide an aqueous slurry of desiccant and fire retardant.

Additives such as retention aids and binders suitable for maintaining the integrity of the paperboard can be added to the desiccant/fire retardant slurry for purposes of improving paperboard strength by bonding fibrous material together to form a matrix and for retention of the desiccant and fire retardant material on and within the fibrous material matrix. Binders which have been found suitable for use with acrylic or cellulose (wood pulp) fibers include acrylic latex, starch, polyvinyl alcohols, microcrystalline cellulose, for example, carboxymethyl cellulose. The slurry being used can contain 2.5 to 4% solids.

The fibrous material slurry may be first added to the headbox of a paper-making machine and then the desiccant/fire retardant slurry added thereto and mixed thoroughly. A flocculant may be added to the headbox to permit the fibrous material/desiccant/fire retardant suspension to form flocs which are more easily retained on the paper machine moving screen. In the paperboard making process, the suspension is passed to a moving screen and water removed therefrom to form a wet paper. The wet paper is dried and pressed, if desired, by calendering rolls to form a smooth surface on the paperboard. Typically, the paperboard is formed to a thickness in the range of 0.005 to 0.02 inch, typically about 0.01 inch.

Forming Single-Faced Corrugated Media

The paperboards thus formed containing solid desiccant and fire retardant impregnated during the paper manufacturing processes are formed into heat and moisture transfer bodies such as total energy transfer wheels or enthalpy wheels. For example, the paperboard can be formed into such wheels by the formation of corrugated paper having the desired thickness and periodicity and bonded to a flat paperboard of similar composition to produce a single-faced corrugated sheet. The single-faced corrugated sheet is spirally rolled into a wheel configuration with the passages or channels formed by the corrugations and flat paperboard being parallel to the axial direction of the wheel. To maximize moisture and heat transfer, the paperboard should be as thin as possible while maintaining strength to minimize the pressure drop across the wheel. Thin paperboard permits the manufacture of smaller channels to provide higher surface area for heat and moisture transfer.

In this manner, an enthalpy wheel can be manufactured that provides for improved levels of moisture and heat transfer. Further, the enthalpy wheel can be readily mass produced in a cost effective, manner. Conventional papermaking equipment and corrugating equipment can be used for manufacturing. Additionally, the invention has the advantage that inexpensive organic fiber can be used with the fire retardant with freedom from smoke and fire problems. Further, the fire retardant has the added benefit that it provides for improved heat transfer.

The following paperboard samples as in Table 1 were fabricated following steps of the invention to determine that a zeolite desiccant material and that alumina trihydrate fire retardant material could be formed into sheet or paperboard material.

TABLE 1

| Paper ID | Acrylic Fiber (%) | Cellulose (%) | Desiccant (%) | Fire Retardant (%) | Latex Binder (%) | Form Produced |
| --- | --- | --- | --- | --- | --- | --- |
| LLC2 | 46.3 | 0.0 | 46.2 | 0 | 7.5 | handsheet |
| LLC3 | 46.3 | 0.0 | 30.0 | 16.3 | 7.5 | handsheet |
| LLC4 | 36.3 | 10.0 | 30.0 | 16.3 | 7.5 | handsheet |
| LLC5 | 56.3 | 0.0 | 20.0 | 16.3 | 7.5 | handsheet |
| LLC6 | 46.3 | 10.0 | 20.0 | 16.3 | 7.5 | handsheet |
| LLC7 | 56.0 | 0.0 | 20.0 | 14.0 | 10.0 | handsheet |
| LLC8 | 65.0 | 0.0 | 20.0 | 5.0 | 10.0 | handsheet |
| LLC9 | 59.3 | 0.0 | 11.7 | 17.5 | 11.7 | pilot |
| LLC10 | 42.9 | 10.6 | 19.3 | 19.3 | 7.9 | pilot |
| LLC11 | 58.0 | 0.0 | 15.5 | 15.5 | 11.0 | pilot |
| LLC12 | 25.0 | 25.0 | 20.0 | 20.0 | 10.0 | handsheet |
| LLC13 | 0.0 | 50.0 | 20.0 | 20.0 | 10.0 | handsheet |

The acrylic fibers used had a length of 6.4 mm with approximately 3 denier. Cellulose fibers used had a length of 13 mm. The desiccant was a 4A molecular sieve having a channel opening of about 4 Angstroms. The fire retardant was alumina trihydrate.

The paper sheets were formed by both making handsheets in a laboratory handsheet apparatus and using a fourdrinier paper machine. The handsheet mold consisted of an open top vessel with square 12 by 12 inch wire screen at its bottom where the paper sheet was formed. The vessel was hinged immediately above the screen to allow the paper to be pealed from the screen. Below the screen was a funnel which led to a standpipe and valve. When the valve was opened, the standpipe, which was full of water, emptied, pulling a vacuum on the pulp slurry above the screen. This caused the pulp mixture to deposit on the screen, forming the paper. The wet paper was pressed gently with blotter paper to remove additional moisture before it was pealed from the screen. It is then removed and dried on a hot metal surface, i.e., photographic print drier.

The foudrinier paper machine applies the same principles as the handsheet apparatus but makes paper continuously by providing a moving "wire" (screen belt) which passes over a vacuum section to remove most of the water from the slurry and the paper which is formed. Before the paper is pealed from the wire, it normally travels over a wet press section where a porous roller may be used to squeeze additional moisture from the paper. Because the wire continuously moves, it can cause fiber orientation which imparts higher tensile strength in the machine direction than in the cross direction. The paper then passes to a series of large diameter steam-heated metal rollers (called cans) which dry the paper. The paper can then optionally be calendared or pressed at high pressure between two or more steel rollers to reduce caliper and increase paper density. Paper leaving the calendar rolls or heater cans is then wound on a core.

Most of the variables (except directional tensile strength) of a papermaking machine can be simulated in a handsheet mold and commercial processes normally scale-up well.

The furnish (batch mixture) is optimized to provide acceptably fast drainage rate and a high retention on the screen (usually >80%). Batch additives such as binders and flocculants are added at different parts of the process. In the examples, the flame retardant, desiccant and binder were added to the refined fiber pulp and subjected to shear before transfer to the handsheet mold or the headbox of the paper machine. Although 5 to 10% acrylic emulsion was used as binder for the tests listed, other binders such as starch or polyvinyl alcohol/acetate (PVA) could be substituted. A flocculant was added at the handsheet mold (or headbox) to provide improved drainage rates and retention.

Tensile strength is an important property of the paper produced because a minimum tensile strength of 3 to 4 lbs. and preferably >7 lbs. is needed to survive the corrugation process. Tensile strengths were measured by cutting strips of paper 1-inch wide by 5-inches long, clamping the ends and stretching them at a fixed rate of speed in an Instron tensile strength apparatus. This instrument is able to detect the maximum force applied before breakage. 3 to 5 specimens are used to give an average tensile strength. In the case of machine-made papers, specimen strips are cut in both machine and cross directions and separate values are recorded. Caliper (paper thickness) was determined using an automated micrometer. Tensile strengths and calipers for papers reported in Table 2 are as follows:

| Paper ID | Caliper (inches) | Density (g/cc) | Handsheet or Machine Direction Tensile Strength (lbs/in) | Cross Direction Tensile Strength (lbs/in) |
| --- | --- | --- | --- | --- |
| LLC2 | 0.008 | 0.905 | 7.7 | |
| LLC6 | | | 10.2 | |
| LLC7 | | | 9.6 | |
| LLC8 | | | 12.5 | |
| LLC9 | 0.079 | 0.65 | 14.5 | 11.9 |
| LLC10 | 0.031 | 0.72 | 13.9 | 8.4 |
| LLC11 | 0.085 | 0.69 | 8.7 | 12.6 |
| LLC12 | | | 12.4 | 9.2 |
| LLC13 | | | 11.6 | 85.2 |

While the invention has been described in terms of preferred embodiments, the claims appended hereto are intended to encompass other embodiments which fall within the spirit of the invention.

What is claimed is:

1. A gas permeable, sensible and latent heat exchange media having a multiplicity of passageways therethrough through which an air stream can flow, the sensible and latent heat exchange media comprising:
   (a) a fibrous support material; and
   (b) desiccant material and fire retardant contained in said fibrous support material, said desiccant material selected from the group consisting of silica gels, activated aluminas and molecular sieves, said fibrous support material and said fire retardant capable of adsorbing sensible heat from a warm air stream and releasing absorbed sensible heat into a cool air stream as said warm and cool air streams flow through said sensible and latent heat exchange media, said desiccant material capable of adsorbing moisture from a humid air stream flowing through said sensible and latent heat exchange media and capable of releasing adsorbed moisture into a dry air stream flowing said passageways of said sensible and latent heat exchange media.

2. The sensible and heat exchange media in accordance with claim 1 wherein desiccant material and said fire retardant together are present in said media in the range of from about 5 to 90% by weight.

3. The sensible and heat exchange media in accordance with claim 1 wherein said desiccant material is present in said media in the range of about 5 to 75% by weight.

4. The sensible and heat exchange media in accordance with claim 1 wherein said desiccant material is present in said media in the range of about 5 to 60% by weight.

5. The sensible and heat exchange media in accordance with claim 1 wherein said desiccant material is present in said media in the range of about 10 to 55% by weight.

6. The sensible and heat exchange media in accordance with claim 1 wherein said fire retardant is present in said media in the range of about 5 to 35% by weight.

7. The sensible and heat exchange media in accordance with claim 1 wherein said fire retardant is present in said media in the range of about 10 to 55% by weight.

8. The sensible and heat exchange media in accordance with claim 1 wherein said desiccant material is present in said media in the range of about 5 to 60% by weight and said fire retardant is present in the range of about 5 to 35% by weight.

9. The sensible and heat exchange media in accordance with claim 1 wherein said fibrous material is selected from the group consisting of cellulosic fibers and synthetic organic fibers.

10. The sensible and heat exchange media in accordance with claim 1 wherein the fibrous material is an organic synthetic fibrous material selected from the group consisting of polyethylene, polypropylene, acrylic, acetate, nylon and polyaramid fibers.

11. The sensible and heat exchange media in accordance with claim 1 wherein said desiccant is selected from at least one of the group consisting of activated alumina, silica gels and crystalline zeolites.

12. The sensible and heat exchange media in accordance with claim 1 wherein said desiccant is crystalline zeolites.

13. The sensible and heat exchange media in accordance with claim 1 wherein said desiccant is a zeolite selected from one of the group consisting of 3A, 4A, 5A, 13X, NaY, HY and USY.

14. The sensible and heat exchange media in accordance with claim 1 wherein said desiccant is a zeolite selected from one of the group consisting of 3A and 4A zeolites.

15. The sensible and heat exchange media in accordance with claim 1 wherein said desiccant is a 3A zeolite.

16. The sensible and heat exchange media in accordance with claim 1 wherein said desiccant is a 4A zeolite.

17. The sensible and heat exchange media in accordance with claim 1 wherein said fire retardant is selected from the group consisting of alumina trihydrate and hydroxides of magnesium, antimony and molybdenum.

18. The sensible and heat exchange media in accordance with claim 1 wherein said fire retardant is alumina trihydrate.

19. A gas permeable, sensible and latent heat exchange media having a multiplicity of passageways therethrough through which an air stream can flow, the sensible and latent heat exchange media comprising:
(a) a fibrous support material; and
(b) zeolite desiccant material and fire retardant contained in said fibrous support material, said zeolite desiccant material and fire retardant present together in said media in the range of 5 to 90 wt. %, said fibrous support material and said fire retardant capable of adsorbing sensible heat from a warm air stream and releasing absorbed sensible heat into a cool air stream as said warm and cool air streams flow through said sensible and latent heat exchange media, said desiccant material capable of adsorbing moisture from a humid air stream flow through said sensible and latent heat exchange media and capable of releasing adsorbed moisture into a dry air stream flowing said passageways of said sensible and latent heat exchange media.

20. A gas permeable, sensible and latent heat exchange media having a multiplicity of passageways therethrough through which an air stream can flow, the sensible and latent heat exchange media comprising:
(a) a fibrous support material; and
(b) zeolite desiccant material and alumina trihydrate fire retardant contained in said fibrous support material, said zeolite desiccant material having an average pore diameter of about 3 or 4 Angstroms, said fibrous support material and said fire retardant capable of adsorbing sensible heat from a warm air stream and releasing absorbed sensible heat into a cool air stream as said warm and cool air streams flow through said sensible and latent heat exchange media, said desiccant material capable of adsorbing moisture from a humid air stream flow through said sensible and latent heat exchange media and capable of releasing adsorbed moisture into a dry air stream flowing said passageways of said sensible and latent heat exchange media.

21. A gas permeable, sensible and latent heat exchange media having a multiplicity of passageways therethrough through which an air stream can flow, the sensible and latent heat exchange media comprising:
(a) a fibrous support material fabricated from organic synthetic fibers selected from the group consisting of polyethylene, polypropylene, acrylic, acetate, nylon and polyaramid fibers; and
(b) zeolite desiccant material and alumina trihydrate fire retardant contained in said fibrous support material, said zeolite desiccant material having an average pore diameter of about 3 or 4 Angstroms, said zeolite desiccant material and fire retardant present together in said media in the range of 5 to 90 wt. %, said fibrous support material and said fire retardant capable of absorbing sensible heat from a warm air stream and releasing absorbed sensible heat into a cool air stream as said warm and cool air streams flow through said sensible and latent heat exchange media, said desiccant material capable of adsorbing moisture from a humid air stream flow through said sensible and latent heat exchange media and capable of releasing adsorbed moisture into a dry air stream flowing said passageways of said sensible and latent heat exchange media.

22. An enthalpy wheel having a gas permeable media for recovering sensible and latent heat from an air stream, the wheel comprising:
(a) a hub for supporting a gas permeable, sensible and latent heat exchange media circumferentially thereabout; and
(b) a gas permeable, sensible and latent heat exchange media having a multiplicity of passageways therethrough through which an air stream can flow, the sensible and latent heat exchange media comprising:
(i) a fibrous support material; and
(ii) a desiccant material selected from the group consisting of silica gels, activated aluminas and molecular sieves and a fire retardant contained in said fibrous support material, said fibrous support material and said fire retardant capable of adsorbing sensible heat from a warm air stream and releasing absorbed sensible heat into a cool air stream as said warm and cool air streams flow through said sensible and latent heat exchange media, said desiccant material capable of adsorbing moisture from a humid air stream flowing through said sensible and latent heat exchange media and capable of releasing adsorbed moisture into a dry air stream flowing said passageways of said sensible and latent heat exchange media.

23. The sensible and heat exchange media in accordance with claim 22 wherein said desiccant material and said fire retardant together are present in said media in the range of from about 5 to 90% by weight.

24. The sensible and heat exchange media in accordance with claim 22 wherein said desiccant material is present in said media in the range of about 5 to 75% by weight.

25. The sensible and heat exchange media in accordance with claim 22 wherein said desiccant material is present in said media in the range of about 5 to 60% by weight.

26. The sensible and heat exchange media in accordance with claim 22 wherein said desiccant material is present in said media in the range of about 10 to 55% by weight.

27. The sensible and heat exchange media in accordance with claim 22 wherein said fire retardant is present in said media in the range of about 5 to 35% by weight.

28. The sensible and heat exchange media in accordance with claim 22 wherein said fire retardant is present in said media in the range of about 10 to 55% by weight.

29. The sensible and heat exchange media in accordance with claim 22 wherein said desiccant material is present said media in the range of about 5 to 60% by weight and said fire retardant is present in the range of about 5 to 35% by weight.

30. The sensible and heat exchange media in accordance with claim 22 wherein said fibrous material is selected from the group consisting of cellulosic fibers and synthetic organic fibers.

31. The sensible and heat exchange media in accordance with claim 22 wherein the fibrous material is an organic synthetic fibrous material selected from the group consisting of polyethylene, polypropylene, acrylic, acetate, nylon and polyaramid fibers.

32. The sensible and heat exchange media in accordance with claim 22 wherein said desiccant is selected from at least one of the group consisting of activated alumina, silica gels and crystalline zeolites.

33. The sensible and heat exchange media in accordance with claim 22 wherein said desiccant is crystalline zeolites.

34. The sensible and heat exchange media in accordance with claim 22 wherein said desiccant is a zeolite selected from one of the group consisting of 3A, 4A, 5A, 13X, NaY, HY and USY.

35. The sensible and heat exchange media in accordance with claim 22 wherein said desiccant is a zeolite selected from one of the group consisting of 3A and 4A zeolites.

36. The sensible and heat exchange media in accordance with claim 22 wherein said desiccant is a 3A zeolite.

37. The sensible and heat exchange media in accordance with claim 22 wherein said desiccant is a 4A zeolite.

38. The sensible and heat exchange media in accordance with claim 22 wherein said fire retardant is selected from the group consisting of alumina trihydrate and hydroxides of magnesium, antimony and molybdenum.

39. The sensible and heat exchange media in accordance with claim 22 wherein said fire retardant is alumina trihydrate.

40. An enthalpy wheel having a gas permeable media for recovering sensible and latent heat from an air stream, the wheel comprising:
  (a) a hub for supporting a gas permeable, sensible and latent heat exchange media circumferentially thereabout; and
  (b) a gas permeable, sensible and latent heat exchange media having a multiplicity of passageways therethrough through which an air stream can flow, the sensible and latent heat exchange media comprising:
    (i) a fibrous support material; and
    (ii) zeolite desiccant material and fire retardant contained in said fibrous support material, said zeolite desiccant material and fire retardant present together in said media in the range of 5 to 90 wt. %, said fibrous support material and said fire retardant capable of adsorbing sensible heat from a warm air stream and releasing absorbed sensible heat into a cool air stream as said warm and cool air streams flow through said sensible and latent heat exchange media, said desiccant material capable of adsorbing moisture from a humid air stream flowing through said sensible and latent heat exchange media and capable of releasing adsorbed moisture into a dry air stream flowing said passageways of said sensible and latent heat exchange media.

41. An enthalpy wheel having a gas permeable media for recovering sensible and latent heat from an air stream, the wheel comprising:
  (a) a hub for supporting a gas permeable, sensible and latent heat exchange media circumferentially thereabout; and
  (b) a gas permeable, sensible and latent heat exchange media having a multiplicity of passageways therethrough through which an air stream can flow, the sensible and latent heat exchange media comprising:
    (i) a fibrous support material; and
    (ii) a zeolite desiccant material and alumina trihydrate fire retardant contained in said fibrous support material, said zeolite desiccant material having an average pore diameter of about 3 or 4 Angstroms, said fibrous support material and said fire retardant capable of adsorbing sensible heat from a warm air stream and releasing absorbed sensible heat into a cool air stream as said warm and cool air streams flow through said sensible and latent heat exchange media, said desiccant material capable of adsorbing moisture from a humid air stream flowing through said sensible and latent heat exchange media and capable of releasing adsorbed moisture into a dry air stream flowing said passageways of said sensible and latent heat exchange media.

42. An enthalpy wheel having a gas permeable media for recovering sensible and latent heat from an air stream, the wheel comprising:
  (a) a hub for supporting a gas permeable, sensible and latent heat exchange media circumferentially thereabout; and
  (b) a gas permeable, sensible and latent heat exchange media having a multiplicity of passageways therethrough through which an air stream can flow, the sensible and latent heat exchange media comprising:
    (i) a fibrous support material fabricated from organic synthetic fibers selected from the group consisting of polyethylene, polypropylene, acrylic, acetate, nylon and polyaramid fibers; and
    (ii) zeolite desiccant material and alumina trihydrate fire retardant contained in said fibrous support material, said zeolite desiccant material having an average pore diameter of about 3 or 4 Angstroms, said zeolite desiccant material and fire retardant present together in said media in the range of 5 to 90 wt. %, said fibrous support material and said fire retardant capable of adsorbing sensible heat from a warm air stream and releasing absorbed sensible heat into a cool air stream as said warm and cool air streams flow through said sensible and latent heat exchange media, said desiccant material capable of adsorbing moisture from a humid air stream flowing through said sensible and latent heat exchange media and capable of releasing adsorbed moisture into a dry air stream flowing said passageways of said sensible and latent heat exchange media.

* * * * *